United States Patent
Kim

(10) Patent No.: US 7,891,460 B2
(45) Date of Patent: Feb. 22, 2011

(54) GEAR BOX-TYPED ACTIVE FRONT STEERING SYSTEM IN VEHICLE

(75) Inventor: Youngkwang Kim, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 443 days.

(21) Appl. No.: 11/934,339

(22) Filed: Nov. 2, 2007

(65) Prior Publication Data

US 2009/0071744 A1  Mar. 19, 2009

(30) Foreign Application Priority Data

Sep. 17, 2007  (KR) .................. 10-2007-0094119

(51) Int. Cl.
B62D 5/04 (2006.01)
(52) U.S. Cl. .................................... 180/443
(58) Field of Classification Search .............. 180/443, 180/444
See application file for complete search history.

(56) References Cited

U.S. PATENT DOCUMENTS

| 3,113,787 | A | * | 12/1963 | Lauderdale | ............ 280/86.758 |
| 3,972,248 | A | * | 8/1976 | Adams | .......................... 74/498 |
| 5,076,381 | A | * | 12/1991 | Daido et al. | ................. 180/446 |
| 5,205,371 | A | * | 4/1993 | Karnopp | ...................... 180/444 |
| 5,265,019 | A | * | 11/1993 | Harara et al. | ................. 701/41 |
| 5,284,219 | A | * | 2/1994 | Shimizu et al. | ............. 180/444 |
| 6,250,421 | B1 | * | 6/2001 | Poshadlo | ..................... 180/446 |
| 7,154,244 | B2 | * | 12/2006 | Asaumi et al. | ............... 318/599 |
| 7,233,850 | B2 | * | 6/2007 | Nakano et al. | ................. 701/41 |
| 7,322,898 | B2 | * | 1/2008 | Augustine et al. | ............. 475/19 |
| 2005/0051989 | A1 | | 3/2005 | Jung | |
| 2005/0121251 | A1 | * | 6/2005 | Ueno et al. | .................. 180/444 |
| 2005/0145433 | A1 | * | 7/2005 | Akuta et al. | ................. 180/443 |
| 2006/0052201 | A1 | * | 3/2006 | Augustine et al. | ............. 475/19 |
| 2006/0107764 | A1 | | 5/2006 | Paek | |
| 2006/0113142 | A1 | * | 6/2006 | Yun | ........................... 180/444 |
| 2006/0123926 | A1 | | 6/2006 | Paek | |
| 2006/0162991 | A1 | | 7/2006 | Kuehnhoefer et al. | |
| 2007/0205041 | A1 | * | 9/2007 | Nishizaki et al. | ............ 180/446 |
| 2008/0184838 | A1 | * | 8/2008 | Hayashi et al. | ........... 74/484 R |

FOREIGN PATENT DOCUMENTS

WO    2004089724    10/2004

* cited by examiner

Primary Examiner—Lesley Morris
Assistant Examiner—Daniel Yeagley
(74) Attorney, Agent, or Firm—Greenblum & Bernstein P.L.C.

(57) ABSTRACT

According to an active front steering system (AFS) of the invention, an actuator assembly that receives steering input from a driver and AFS input from a motor is mounted to a gear box that reciprocates a rack bar connected to tie rods that are connected to wheels. Therefore, the entire size of the AFS is reduced and a decelerator that changes the steering ratio includes a single planetary gear that outputs final steering through rack bar after the steering input from the driver and the AFS input from motor are inputted across each other.

20 Claims, 5 Drawing Sheets

(A)

(B)

(C)

(A)

(B)

GEAR BOX-TYPED ACTIVE FRONT STEERING SYSTEM IN VEHICLE

CROSS-REFERENCE TO RELATED APPLICATIONS

The present application is based on, and claims priority from, Korean Application Serial Number 10-2007-0094119, filed on Sep. 17, 2007, the disclosure of which is hereby incorporated by reference herein in its entirety.

FIELD OF THE INVENTION

The present invention relates to an active front steering wheel, particularly a gear box-typed active front steering system.

BACKGROUND OF THE INVENTION

In general, a power steering system that generates steering force for a vehicle is designed to use hydraulic pressure for smooth and rapid steering with a small force.

The power steering system has the advantage of steering a vehicle with a small force, selecting operational force regardless of the steering gear ratio, and preventing impact due to roughness of the road surface from being transmitted to the steering wheel by absorbing it.

Further, for example, motor driven steering wheel systems, such as EHPS (Electro-Hydraulic Power steering) or MDPS (Motor Driven Power Steering), which allow comport and smooth steering while traveling at a low speed, heavy steering with a good directional stability while traveling at a high speed, and rapid steering in an emergency by driving a motor using an ECU (Electronic Control Unit) depending on the traveling condition of a vehicle that is detected by a vehicle speed sensor and a steering torque sensor to provide optimum steering condition to the driver, has been used in recent years.

Furthermore, an AFS (Active Front Steering) control system of an active front wheel steering type is applied. The AFS, a single output steering system for double input (the input transmitted through the steering wheel from a driver and input from a motor), can increase or decrease the steering angle using an actuator as well as the steering wheel by the driver. Therefore, it improves steering response by reducing the steering ratio at a low speed and increasing the steering ratio at a high speed so that the driver can relatively stably drive a vehicle even at a high speed.

Further, in addition to achieving smaller or larger steering output than the force applied by the driver, the AFS can accomplish active control of a vehicle by integrally controlling with the cooperation of other systems such as ESC (Electronic Control Suspension System) or MDPS (Motor Driven Power Steering).

Considering the characteristics in operation, the AFS can be largely divided into an actuator that applies additional steering input other than the steering wheel from the driver and an AFS ECU that changes the steering output by controlling the actuator. The actuator, the most important part for the performance of the AFS, includes a common motor and a decelerator.

Further, since the AFS controls the steering input from the driver using power of the motor, it is possible to vary the configuration and operating and mounting ways of the actuator. Therefore, it is possible to reduce the entire configuration of the AFS as well as the size of the actuator itself.

However, since the decelerator of the actuator in the AFS receives both the input from the driver and the motor, the configuration of the decelerator becomes complicated and the size of the actuator increases. Therefore, the actuator has many limitations in mounting to the steering system, and even if it is mounted, it increases the entire size, such that it is difficult to accomplish a compact AFS.

Further, it is possible to manufacture the decelerator in a simple structure to achieve a compact AFS, for example, when the steering wheel input member of the decelerator and the AFS ECU input member are coaxially arranged and a harmonic gear-typed decelerator that can provide a high gear ratio in a small space is used, it is possible to reduce the size of the AFS.

However, the harmonic gear-typed decelerator requires high machining precision for the harmonic gear, such that it is difficult to manufacture the harmonic gear-typed decelerator at high manufacturing cost. Therefore, the harmonic gear cannot be easily used when it is needed.

SUMMARY OF THE INVENTION

The present invention reduces the entire size of an AFS (Active Front Steering) by disposing an actuator assembly to a side of a gear box that is controlled by an AFS ECU, at the steering input portion that is connected to the gear box that controls the wheels.

The present invention provides a single planetary gear type decelerator that generates variable steering ratios of an actuator assembly by arranging the actuator assembly that is mounted to the side of a gear box in a steering system such that it is connected with the portion that directly receives steering input from a driver along with the portion that receives input from a motor driven by an AFS ECU.

The present invention achieves a simple design of an AFS with reduced parts of a decelerator by forming the decelerator of the actuator assembly controlled by an AFS ECU into a single planetary gear type.

The present invention minimizes changes in the design due to the position of a gear box in a steering system and the car body by designing the configuration of the steering system such that the steering input position in respect to a driver and an actuator assembly disposed at the side of a gear box in the steering system and the input position from a motor driven by an AFS ECU can be shifted.

Embodiments of the invention provide an active front steering system that includes a steering column, an AFS ECU, and an actuator assembly. The steering column is joined to a steering column joint that is connected to a gear box to transmit steering force applied to a steering wheel by a driver to the gear box that reciprocates a rack bar connected with tie rods 5 that are connected to wheels. The AFS ECU calculates motor control values using steering values and information of speed of a vehicle to obtain desired steering output on the basis of the speed, and corrects the desired steering output where the result from the operation of the motor is fed-back. The actuator assembly has an AFS input portion, a steering input portion, and a decelerator. The AFS input portion protrudes from a side of a housing that accommodates the rack bar and forms the entire outer shape of the gear box, and normally/reversely rotates while communicating with the AFS ECU. The steering input portion vertically protrudes from the gear box and connected to the steering column joint that is connected to the steering column that receives the steering force from the steering wheel. The decelerator is mounted in the housing to allow the rack bar to reciprocate with rotation and generates final steering output that changes the steering response from the steering wheel to the driver on the basis of the speed of the vehicle that is traveling by adding the steering input to the AFS input.

Further, the AFS input portion is arranged across above the rack bar at the rear side of the gear box and the steering input portion is arranged vertical to the rack bar at the front side of the gear box.

Further, the AFS input portion includes a motor that is controlled by the AFS ECU to normally/reversely rotate and an AFS input member that is connected to a motor shaft of the motor and has teeth on the outside to transmit the rotational force in rotation. The steering input portion includes a steering input member that is rotated by the steering column joint connected to steering wheel through the steering column. The decelerator includes a ring gear, planetary gears, a sun gear, and a carrier. The ring gear is engaged with the steering input member of the steering input portion and rotated by the steering wheel rotated by the driver. The planetary gears rotate in engagement with the inside of the ring gear. The sun gear reciprocates the rack bar while rotating in engagement with the outside of the planetary gears. The carrier is rotated by the AFS input member of the AFS input portion and has long rod-shaped planetary gear fixing shafts that protrude from a side of the carrier to fix the carrier to the planetary gears.

The sun gear and the carrier respectively have a ball nut that is fitted in the sun gear and the carrier and engaged with the rack bar.

The AFS input member of the AFS input portion is engaged with the ring gear in the decelerator. The steering input member of the steering input portion is engaged with the carrier that is fixed to the planetary gears engaged with the inside of the ring gear by the planetary gear fixing shafts.

The part of the decelerator where the AFS input portion is connected includes the sun gear in which the ball nut engaged with the rack bar is fitted and the ring gear of which the inside is engaged with the planetary gears that are engaged with the outside of the sun gear. The part of the decelerator where the steering input portion is connected includes a gear assembly that is fixed to the planetary gears to receive the rotational force from the planetary gears. The gear assembly includes a steering input gear and a steering input carrier. The steering input gear is formed at the end of a steering input shaft. The steering input carrier is engaged with the steering input gear and fixed to the planetary gears engaged with the inside of the ring gear that is engaged with the AFS input member by the planetary gear fixing shafts. The steering input gear and the steering input carrier are engaged across each other.

According to an active front steering system, it is possible to reduce a space for an actuator assembly by disposing the actuator assembly to a side of a gear box and achieves a compact AFS without changes in design due to the mounting position in a vehicle by using a single planetary gear type decelerator that connects the portion that receives steering input from a driver with the portion that receives input from a motor driven by an AFS ECU.

Further, according to an active front steering system, it is possible to achieve a decelerator having a simple configuration with the number of parts reduced by using an actuator assembly disposed at a side of a gear box of the steering system for a decelerator.

Further, according to an active front steering system, since an actuator assembly of an AFS is disposed at a side of a gear box in the steering system and it is possible to shift the positions where the steering input is transmitted from a driver and where input from a motor driven by an AFS ECU is transmitted, it is possible to minimize changes in the entire design of the AFS.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Hereinafter, preferred embodiments of the invention are described with reference to accompanying drawings by way of example and the invention can be modified in various ways by those skilled in the art and is not limited thereto.

Figure 1:
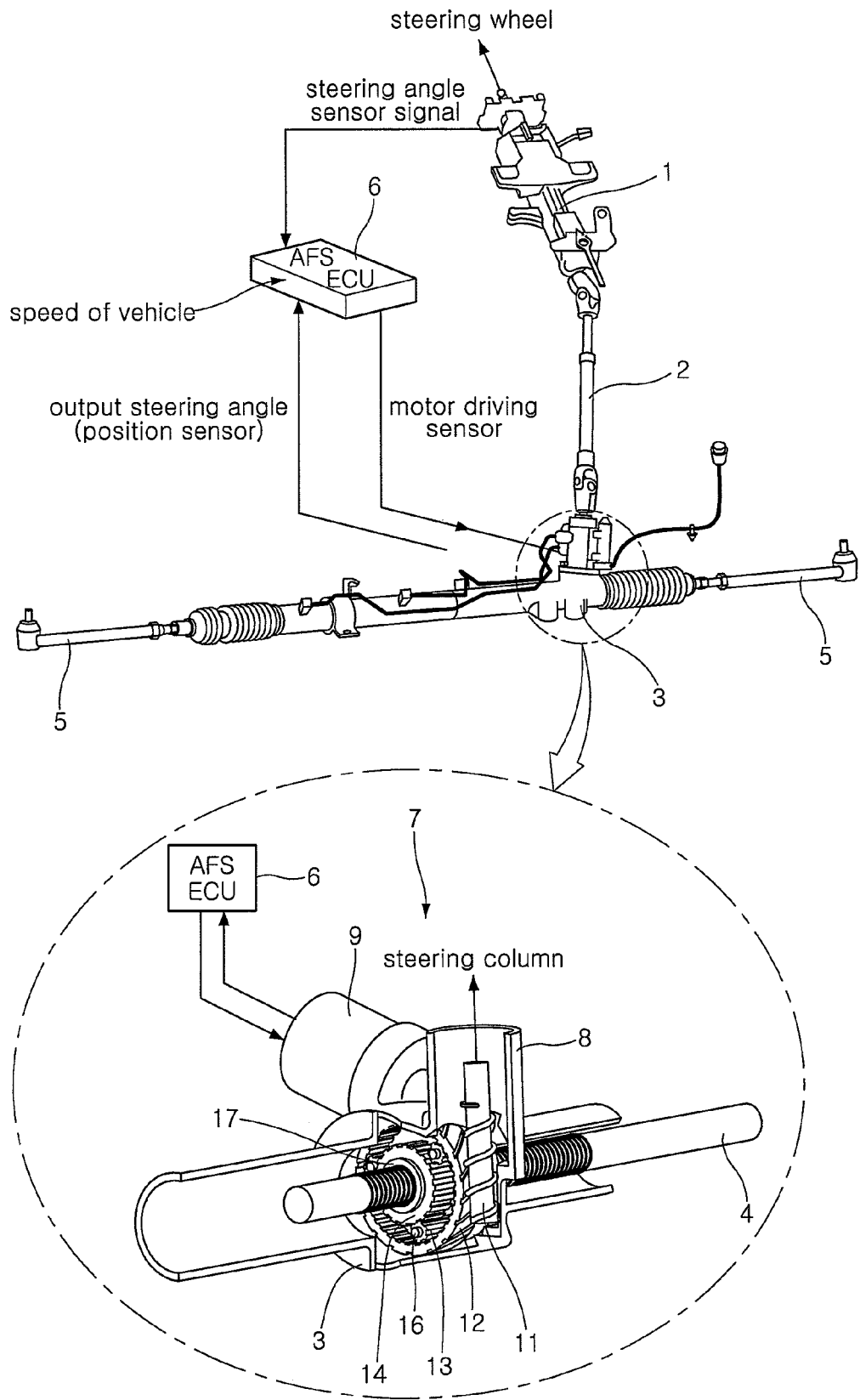
FIG. 1 is a view illustrating the configuration of a gear box-typed active front steering system according to an embodiment of the invention.

FIG. 1 is a view illustrating the configuration of a gear box-typed active front steering system according to an embodiment of the invention. The active front steering system according to an embodiment of the invention includes a steering column 1 that is jointed to a steering column joint 2 connected to a gear box 3 to transmit steering force applied to a steering wheel by a driver to the gear box that reciprocates a rack bar 4 with tie rods 5 connected to wheels, an AFS ECU 6 that receives the operation of the steering wheel by the driver and various information of a vehicle that is traveling and then calculates a desired steering ratio, and an actuator assembly 7 that is integrally mounted in gear box 3 to receive steering wheel input value by the driver and AFS input that is the power of the motor from AFS ECU 6 and changes the steering response transmitted through the steering wheel to the driver depending on the speed of the vehicle.

AFS ECU 6 calculates values for controlling actuator assembly 7 on the basis of desired steering gear ratio that is set depending on the speed of the vehicle, that is, receives the speed of the vehicle that is traveling, sets a desired steering gear ratio depending on corresponding speed of the vehicle using a map of desired steering gear ratio (decelerator) for each speed of the vehicle, calculates an output angle from the steering gear ratio and the output angle, and then controls the position of actuator assembly 7 such that actuator assembly can follow the calculated output angles.

Controlling the position of actuator assembly 7 by AFS ECU 6 is made by receiving information of the motor of actuator assembly 7, that is, feeding-back a value measured by a sensor that measures position according to rotation of the motor.

Further, the sensor includes an input angle sensor that detects a steering input angle of a steering input shaft, an output angle sensor that detects an output steering angle of an output steering shaft, a motor position sensor that detects the position of the motor, and a speed sensor that detects the speed of the vehicle that is traveling, and detects information of changes in the vehicle that is traveling.

As gear box 3 receives the input from the steering wheel and the input from the AFS by the power of the motor of actuator assembly 7, rack bar 4 linearly moves with rotation and tie rods 5 connected with rack bar correspondingly move and turn the wheels at the angle corresponding to the steering.

Further, actuator assembly 7 is mounted by housing 8 that accommodates rack bar 4 and forms the entire outer shape of gear box 3. Housing 8 protrudes at one side to accommodate an AFS input portion that normally/reversely rotates while communicating with AFS ECU 6 and protrudes vertically upward from gear box 3 to accommodate a steering input portion where steering is transmitted through steering column joint 2 connected to steering column 1 from steering wheel.

In addition, the decelerator that allows rack bar 4 to reciprocate with rotation and generates outputs to change steering force applied by the driver depending on the speed of the vehicle using the steering input and AFS input is mounted in housing 8.

Figure 2:
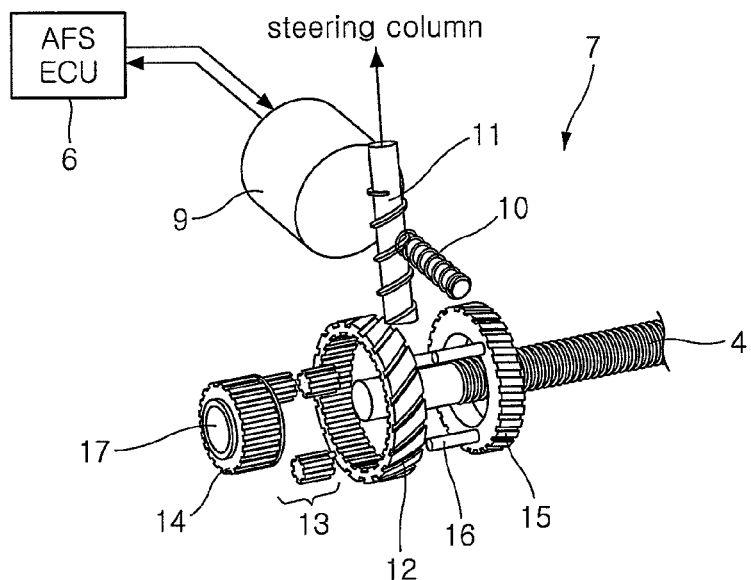
FIGS. 2A to 2C are views illustrating the configuration of an actuator assembly of a gear box-typed active front steering system according to an embodiment of the invention.
Figure 2:
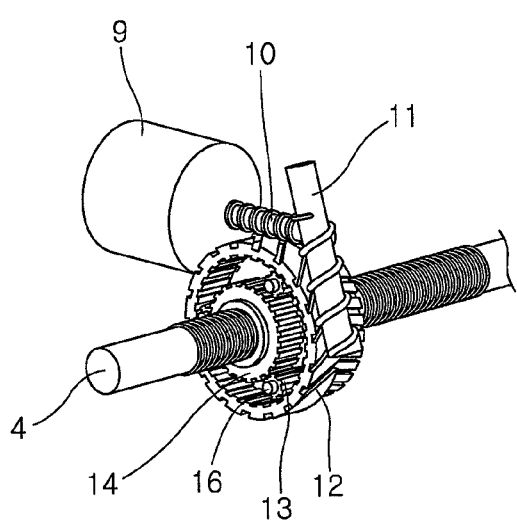
Figure 2:
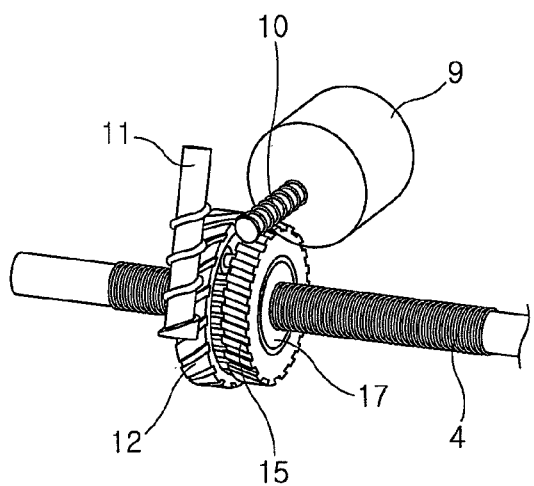

As shown in FIGS. 2A to 2C, actuator assembly 7 includes a motor 9 that is controlled by AFS ECU 6 to normally/reversely rotate the AFS input portion and an AFS input member 10 that is connected to the shaft of motor 9 and has teeth around the outside to transmit the rotational force.

Further, information of motor 9 is fed-back to AFS ECU by the motor position sensor when motor 9 rotates and then AFS ECU 6 can control feedback.

AFS input member 10 may be formed in a variety of shapes, but preferably a long shaft shape with teeth around the outside.

The steering input portion is a steering input member 11 that is rotated with steering column joint 2 connected to steering column 1 that is connected to the steering wheel, and steering input member 11 is formed in a long shaft shape with teeth around the outside.

AFS input member 10 that transmits the input from motor 9 is disposed across steering input member 11 that transmits the input through the steering wheel from the driver, and this configuration decreases the size of actuator assembly 7 that is mounted in gear box 3 and the space for gear box in the engine room accordingly.

The decelerator includes a single planetary gear that accelerates/decelerates steering depending on the rotational direction of the AFS input, such that the decelerator reciprocates rack bar 4 that turns the wheels by the operation of the steering wheel and generates the gear ratio for substantial steering output that controls the operational force of the steering wheel after receiving the AFS input and steering input.

For the above operation, the decelerator includes a ring gear 12 that is engaged with steering input member 11 and rotated by the steering wheel that is turned by the driver, planetary gears 13 that are rotationally engaged with the inside of ring gear 12, a sun gear 14 that is rotationally engaged with the outside of planetary gear 13, and ball nuts 17 that are fitted in sun gear 14 and engaged with rack bar 4, respectively, to reciprocate rack bar 4 when sun gear 14 rotates.

Three planetary gears 13 are arranged at 120° from each other between ring gear 12 and sun gear 14.

The decelerator includes a carrier 15 that is disposed at the side of steering input member 11 to transit the input of AFS input member and the carrier 15 receives rotational force from AFS input member 10 through the teeth on the outside.

Further, carrier 15 is connected to planetary gear 13 to increase/decrease steering input by transmitting the rotational force to the steering input portion. Accordingly, carrier 15 has planetary gear fixing shafts 16 of long rod shape that protrude toward planetary gears 13 and are fitted therein.

Three planetary gear fixing shafts 16 are arranged at 120° from each other, as planetary gears 13.

Further, a ball nut 17 is fitted in carrier 15 and connected with rack bar 4 to reciprocate lack bar 4 when carrier 15 rotates.

The operation of a gear box-typed active front steering system according to an embodiment of the invention is now described in detail with reference to the accompanying drawings.

According to the AFS (Active Front Steering) that is an active front steering system according to an embodiment of the invention, since actuator assembly 7 that receives steering input from the driver and AFS input from motor 9 is mounted in gear box 3 that reciprocates rack bar 4 connected with tie rods 5 that are connected to the wheels, the entire size of the AFS is reduced. Further, the decelerator includes a simple set of planetary gears in which the steering input from the driver and the AFS input from motor 9 are crossed and then outputted through rack bar 4.

In the AFS according to an embodiment of the invention, as shown in FIG. 1, steering input from the steering wheel by the driver is transmitted to actuator assembly 7 at a side of gear box 3 with rack bar 4 connected through steering column joint 2.

The steering input from the steering wheel by the driver is vertically inputted to actuator assembly 7 from above gear box 3.

The AFS input from motor 9 that is driven at a desired steering ratio calculated from AFS ECU 6 that receives information including the operation of the steering wheel by the driver and the speed of the vehicle, that is, calculated from various information including the operation of the steering wheel by the driver and the vehicle that is traveling, is inputted to actuator assembly 7 at the side of gear box 3.

The AFS input from motor 9 is inputted across the steering input at the side of gear box 3, as compared with steering input by the driver that is vertically transmitted from above gear box 3.

Therefore, the AFS according to an embodiment of the invention generates final steering output such that AFS ECU 6 that receives the speed of the vehicle and the operational information of the steering wheel controls the steering response transmitted from the steering wheel to the driver, that is, to increase or decrease steering force applied from the driver by providing the AFS input from motor 9 to actuator assembly 7 receiving the steering input from the driver.

Accordingly, since the final steering output is made by AFS ECU 6, the operation of the AFS is described now according to whether AFS ECU 6 is in operation or not.

First, when the AFS is not in operation, steering force from the steering wheel by the driver is transmitted to gear box 3, in which it is not necessary to change steering response from the steering wheel to the driver when the vehicle that is traveling turns because the speed is low. Therefore, as shown in FIG. 1, the steering force applied to the steering wheel by the driver is directly transmitted to actuator assembly 7 at the side of gear box 7 through steering column 1 and steering column joint 2.

Since AFS ECU 6 does not drive motor, AFS input member 10 of actuator assembly 7 is freely rotated by the decelerator that is rotated by steering input of the driver.

As described above, in actuator assembly 7 that receives the steering force from the driver, as the decelerator is rotated by steering input member 11 connected with steering column joint 2, rack bar 4 reciprocates at a predetermined gear ratio of the decelerator and correspondingly turns the wheels through tie rods 5.

The rotational force of steering input member 11 rotates ring gear 12 engaged with steering input member 11 and ring gear 12 rotates planetary gears 13 engaged with the inside ring gear 12 and sun gear 14 engaged with the outside of planetary gears 13. Accordingly, rack bar 4 is reciprocated by ball nut 17 that is engaged with rack bar 4 inside sun gear 14 and tie rods 5 is correspondingly actuated by rack bar 4 reciprocating.

In the above operation, AFS input member 10 is engaged with carrier 15 that is fixed to planetary gears 13 and carrier 15 rotates in the rotational direction of planetary gear 13, but rotational force is not inputted through AFS input member 10; therefore, it does not affect steering output of the decelerator through steering input member 11.

Therefore, steering input through the steering wheel from the driver is the same in magnitude as the final steering output of gear box 3.

However, the operation changing the steering response from the steering wheel to the driver when the AFS is in operation, that is, the vehicle that is traveling above a predetermined speed turns is classified into an operation that increases the steering response of the steering wheel by making the AFS input the same as the steering input to increase the final steering output of gear box 3 by the driver, or an operation that decreases the steering response of the steering wheel by making the AFS input opposite to the steering input by the driver to decrease the final steering output of gear box 3.

Figure 3:
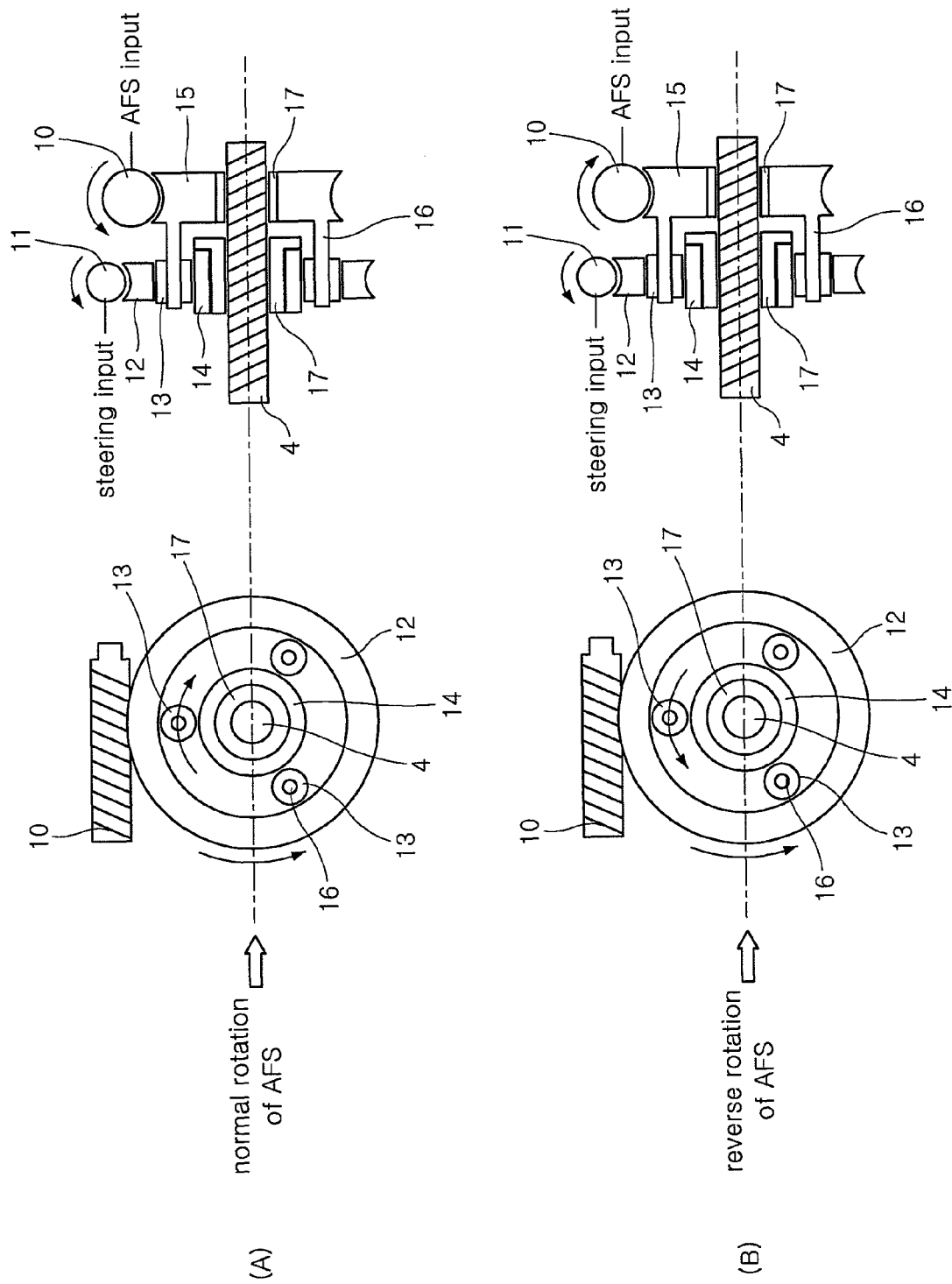
FIGS. 3A and 3B are views illustrating the normal/reverse rotation of a gear box-typed active front steering system according to an embodiment of the invention.

In the operation that increases the steering response of the steering wheel by making the AFS input the same as the steering input to increase the final steering output of gear box 3 by the driver, as shown in FIG. 3A, steering force applied to the steering wheel by the driver is directly inputted to actuator assembly 7 through steering column 1, steering column joint 2, and steering input member 11.

In addition, AFS ECU 6 drives motor 9 on the basis of a desired steering value calculated by AFS ECU 6 and the rotational force of motor 9 is directly inputted to actuator assembly 7 through AFS input member 10.

The force is transmitted to different positions of actuator assembly 7 by steering input member 11 and AFS input member 10, that is, steering input member 11 transmits the force to ring gear 12 to rotate ring gear 12 and AFS input member 10 transmits the force to carrier 15 at the side of ring gear 12 to rotate carrier 15.

AFS input member 10 operates such that the final steering output that increases the steering output through steering input member 11 is outputted from gear box 3.

Therefore, ring gear 12 rotated by steering input member 11 rotates planetary gears 13 engaged with the inside and sun gear 14 engaged with the outside of planetary gears 13 are correspondingly rotated. Accordingly, rack bar 4 actuates tie rods 5 through ball nut 17 engaged with rack bar 4 inside sun gear 14, while reciprocating.

When planetary gears 13 are in rotation, carrier 15 rotated by AFS input member 10 increases the rotational force of planetary gears 13, that is, the rotational force of carrier rotated by AFS input member 10 is applied to planetary gears 13 that are fixed by planetary gear fixing shafts 16 that protrude from carrier 15. Accordingly, in addition to the rotational force transmitted through steering input member 11, the rotational force transmitted through AFS input member 10 is applied to planetary gears 13.

Therefore, as the final steering output from rack bar 4 that is engaged with ball nut 17 fitted in carrier 15 and ball nut 17 fitted in sun gear 14 engaged with the outside of planetary gears 13 is increased, the steering angle increases more than the substantial input of the driver to increase the steering response from the steering wheel to the driver.

On the other hand, in the operation that decreases the steering response of the steering wheel by making the AFS input opposite to the steering input by the driver to decrease the final steering output of gear box 3, opposite to the above operation, carrier 15 that is rotated by the AFS input reduces the rotation of planetary gears 13, in the opposite direction to the rotation of planetary gears 13 that are rotated by the steering input of the driver.

In detail, as shown in FIG. 3B, as the steering force applied to the steering wheel by the driver is transmitted to actuator assembly 7 through steering column 1, steering column joint 2, and steering input member 11, the AFS input applied to AFS input member 10 from motor 9 that is driven on the basis of the desired steering value calculated by AFS ECU 6 is applied to actuator assembly 7.

Therefore, as the force is applied to ring gear 12 of actuator assembly 7 through steering input member 11, planetary gears 13 engaged with the inside of ring gear 12 and sun gear engaged with the outside of planetary gears 13 are sequentially rotated and rack bar 4 actuates tie rods 5 through ball nut 17 engaged with rack bar 4 inside sun gear 14.

Further, the rotation of planetary gears 13 are reduced by carrier 15, that is, as carrier 15 is rotated by AFS input member 10, planetary gears 13 fixed to carrier 15 by planetary fixing shafts 16 receive rotational force from carrier 15 in the opposite direction to the rotation of planetary gears 13 by steering input member 11.

Therefore, carrier 15 rotated by AFS input member 10 reduces the rotational force of planetary gears 13 by steering input member 11, such that the final steering output through rack bar 4 that is engaged with ball nut 17 fitted in carrier 15 and ball nut 17 fitted in sun gear 14 engaged with the outside of planetary gears 13 is reduced.

Accordingly, the steering angle is decreased less than the substantial input of the driver to decrease the steering response from the steering wheel to the driver.

Further, AFS ECU 6 continuously controls feedback using detected information of rotational angle by the rotation of motor 9 of actuator assembly 7, in which motor 9 is controlled on the basis of predetermined speed-to-gear ratio profiles by AFS ECU 6 that receives input steering angle and output steering angle, and the output steering angle is generally fed-back by an absolute position sensor in motor 9.

Figure 4:
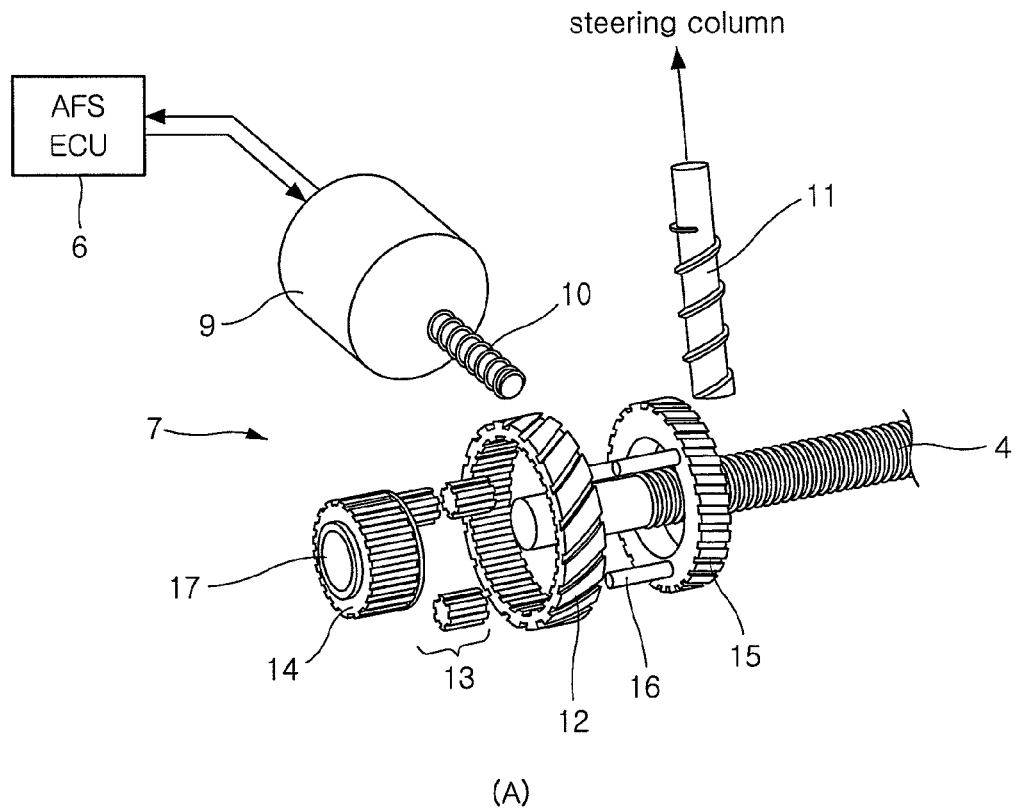
FIGS. 4A and 4B are views showing a modification of the actuator assembly of the gear box-typed active front steering system according to an embodiment of the invention.
Figure 4:
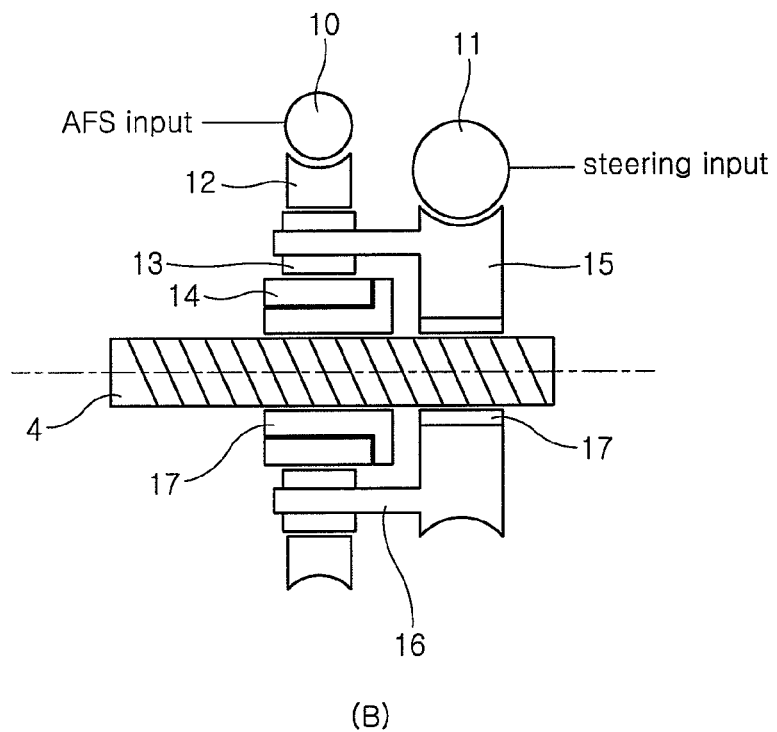

On the other hand, the steering input portion and the AFS input portion that are connected to actuator assembly 7 may be modified in various ways in the active front steering system according to an embodiment of the invention. For example, as shown in FIG. 4A, AFS input member 10 of the AFS input portion and steering input member 11 of the steering input portion may be shifted.

However, the configuration of actuator assembly is not changed, that is, the AFS input portion becomes AFS input member 10 with teeth on the outside that is rotated by motor 9 with a motor position sensor that is controlled to normally/reversely rotate by AFS ECU 6 and the steering input portion becomes steering input member 11 with teeth on the outside that is rotated by steering column joint 2 connected to steering column 1 as the steering wheel turns.

Further, the decelerator includes sun gear 14 in which ball nut 17 engaged with rack bar 4 is fitted and ring gear 12 that is engaged with the inside of planetary gears 13 engaged with the outside of sun gear 14. In addition, carrier 15 with planetary gears 13 fitted on protruding sun gear fixing shafts 16 is disposed to the side of ring gear 12 and ball nut 17 engaged with rack bar 4 is fitted in carrier 15.

However, AFS input member 10 and steering input member 11 of the steering input portion that are connected to the decelerator are shifted, that is, AFS input member 10 is connected to ring gear 12 and ring gear 12 is rotated by the input from the AFS. Further, as shown in FIG. 4B, the rotational force of ring gear 12 accelerates or decelerates the rotation of carrier 15 engaged with steering input member 11.

As the rotation of ring gear by AFS input member 10 is transmitted to carrier 15 through planetary gears 13 engaged with the inside of ring gear 12, the rotation of AFS input member 10 is added to or reduces the rotation of carrier 15 that receives the steering input from the driver. Therefore, the final steering output from rack bar 4 engaged with ball nut 17 fitted in carrier 15 is changed, which was described in relation to the main embodiment and is not described in detail.

Figure 5:
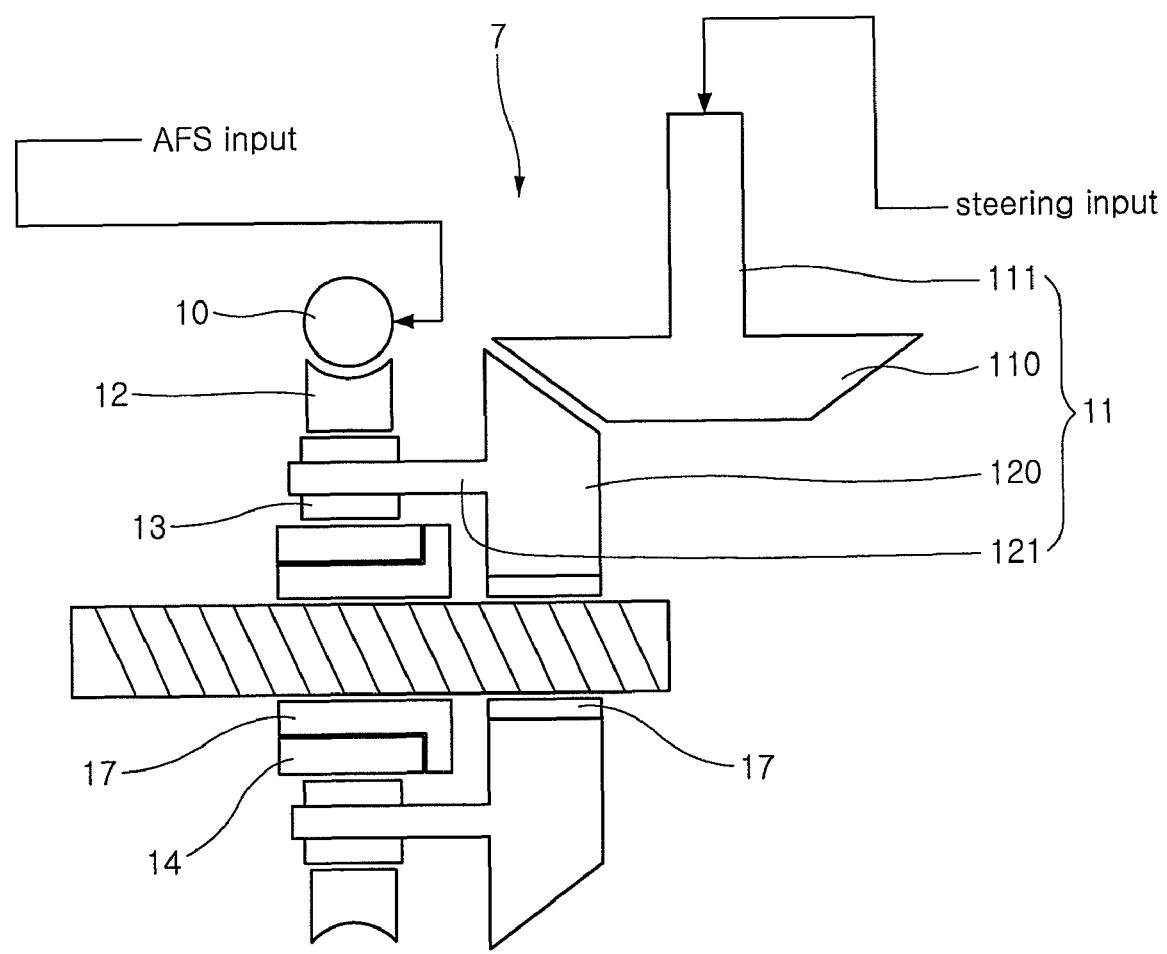
FIG. 5 is a view showing another modification of the actuator assembly of the gear box-typed active front steering system according to an embodiment of the invention.

Further, in the configuration of actuator assembly 7 of the active front steering system according to an embodiment of the invention, the configuration of the decelerator that changes the gear ratio while being rotated by the steering input portion and AFS input portion may be modified, in which, as shown in FIG. 5, the steering input portion may be formed by gear connection.

In detail, the decelerator where AFS input member 10 is connected includes sun gear 14 in which ball nut 17 that is engaged with rack bar 4 is fitted and ring gear 12 where planetary gears 13 that are engaged with sun gear 14 are engaged. Further, steering input member 11 includes a gear assembly that is composed of a steering input gear 110 that is formed at the end of a steering input shaft 111 and a steering input carrier 120 that is engaged with steering input gear 110 and fixed to planetary gears 13 engaged with the inside of ring gear 12 engaged with AFS input member 10 by planetary gear fixing shafts 121.

Steering input member 11, as described above, includes steering input gear 110 and steering input carrier 120 and they are engaged across each other; therefore, steering input gear 110 is a helical type gear.

In the operation of the active front steering system including actuator assembly 7 having the above decelerator, since the rotation of ring gear 12 by AFS input member 10 is transmitted to the steering input portion through planetary gears 13 engaged with the inside of ring gear, as the rotation of AFS input member 10 is added to or reduced from the steering input by the driver, the final steering output from rack bar 4 of gear box 3 is changed, which was also described in relation to the main embodiment and is not described in detail.

However, in this embodiment, since steering input member 11 where the steering input by the driver is transmitted is a helical type gear in which two gears are engaged across each other, steering input from the driver is described for this configuration hereafter.

In detail, as the steering input of the driver is transmitted to steering input shaft 111 of steering input member 11, steering input gear 110 formed at the steering input shaft 111 rotates and steering input carrier 120 engaged with steering input gear 110 rotates.

When the driver turns the steering wheel, steering input carrier 120 receives the rotational force from planetary gears 13 that are rotated by AFS input member 10 through planetary gear fixing shafts 121 and the rotational force from AFS input member 10 changes, that is, accelerates or decelerates the rotation of steering input carrier 120. Therefore, the final steering output from rack bar 4 engaged with ball nut 17 fitted in carrier 120 is changed and the steering response from the steering wheel to the driver increases or decreases.

What is claimed is:

1. A gear box active front steering system, comprising:
   a steering column that is connected to a steering column joint, the steering column joint being connected to a gear box and configured to transmit a steering force applied to a steering wheel by a driver to the gear box that reciprocates a rack bar connected with tie rods that are connected to wheels;
   an AFS ECU that calculates motor control values using steering values and information of speed of a vehicle to obtain desired steering output on the basis of the speed, and corrects the desired steering output when the result from the operation of a motor is fed-back; and
   an actuator assembly that has an AFS input portion, a steering input portion, and a decelerator, the AFS input portion protruding from a side of a housing that accommodates the rack bar and forms the entire outer shape of the gear box, and normally/reversely rotating while communicating with the AFS ECU, the steering input portion vertically protruding from the gear box and connected to the steering column joint that is connected to the steering column that receives the steering force from the steering wheel, and the decelerator being mounted in the housing to allow the rack bar to reciprocate with rotation and generating final steering output that changes the steering response from the steering wheel to the driver on the basis of the speed of the vehicle that is traveling by adding the steering input to the AFS input;
   wherein the decelerator comprises a planetary gear mechanism with shafts extending in a first direction;
   wherein the steering input portion includes a steering input member that is rotated by the steering column joint connected to the steering wheel through the steering column; and
   wherein the steering input member is a long shaft with teeth on the outside that extends in a direction transverse to the first direction of the decelerator planetary gear mechanism shafts.

2. The system as defined in claim 1, wherein the AFS input portion is positioned across above the rack bar at the rear side of the gear box and the steering input portion is arranged vertical to the rack bar at the front side of the gear box.

3. The system as defined in claim 1, wherein the AFS input portion includes the motor that is controlled by the AFS ECU to normally/reversely rotate and an AFS input member that is connected to a motor shaft of the motor and has teeth on the outside to transmit the rotational force in rotation.

4. The system as defined in claim 3, wherein a motor position sensor is mounted in the motor.

5. The system as defined in claim 3, wherein the AFS input member is a long shaft with teeth on the outside.

6. The system as defined in claim 1, wherein the decelerator includes:
   a ring gear that is engaged with the steering input member of the steering input portion and rotated by the steering wheel rotated by the driver;
   planetary gears that rotate in engagement with an inside of the ring gear;
   a sun gear that reciprocates the rack bar while rotating in engagement with an outside of the planetary gears; and
   a carrier that is rotated by an AFS input member of the AFS input portion and has long rod-shaped planetary gear fixing shafts that protrude from a side of the carrier to fix the carrier to the planetary gears.

7. The system as defined in claim 6, wherein three planetary gears are arranged at 120° from each other between the ring gear and the sun gear while being engaged with the inside and outside of the ring gear and the sun gear respectively, and three planetary gear fixing shafts are arranged at 120° from each other.

8. The system as defined in claim 6, wherein the sun gear and the carrier respectively have a ball nut that is fitted in the sun gear and the carrier and engaged with the rack bar.

9. The system as defined in claim 6, wherein the AFS input member of the AFS input portion is engaged with the ring gear in the decelerator and the steering input member of the steering input portion is engaged with the carrier that is fixed to the planetary gears engaged with the inside of the ring gear by the planetary gear fixing shafts.

10. The system as defined in claim 6, wherein a part of the decelerator where the AFS input portion is connected includes the sun gear in which a ball nut engaged with the rack bar is fitted and the ring gear of which the inside is engaged with the planetary gears that are engaged with an outside of the sun gear, and
a part of the decelerator where the steering input portion is connected includes a gear assembly that is fixed to the planetary gears to receive the rotational force from the planetary gears.

11. The system as defined in claim 10, wherein the gear assembly includes a steering input gear formed at the end of a steering input shaft and a steering input carrier that is engaged with the steering input gear and fixed to the planetary gears engaged with the inside of the ring gear that is engaged with the AFS input member by the planetary gear fixing shafts.

12. The system as defined in claim 9, wherein the steering input gear and the steering input carrier are engaged across each other.

13. The system as defined in claim 11, wherein the gear assembly is a helical type gear.

14. The system as defined in claim 10, wherein the gear assembly is a helical type gear.

15. The system as defined in claim 10, wherein the AFS input portion includes the AFS input member with teeth on the outside to be rotated by the motor.

16. The gear box active front steering system according to claim 1, said planetary gear mechanism shafts include shafts of planetary gears and a sun gear.

17. A gear box active front steering system, comprising:
a steering column that is connected to a steering column joint, the steering column joint being connected to a gear box and configured to transmit a steering force applied to a steering wheel by a driver to the gear box that reciprocates a rack bar connected with tie rods that are connected to wheels;
an AFS ECU that calculates motor control values using steering values and information of speed of a vehicle to obtain desired steering output on the basis of the speed, and corrects the desired steering output when the result from the operation of a motor is fed-back; and
an actuator assembly that has an AFS input portion, a steering input portion, and a decelerator, the AFS input portion protruding from a side of a housing that accommodates the rack bar and forms the entire outer shape of the gear box, and normally/reversely rotating while communicating with the AFS ECU, the steering input portion vertically protruding from the gear box and connected to the steering column joint that is connected to the steering column that receives the steering force from the steering wheel, and the decelerator being mounted in the housing to allow the rack bar to reciprocate with rotation and generating final steering output that changes the steering response from the steering wheel to the driver on the basis of the speed of the vehicle that is traveling by adding the steering input to the AFS input;
wherein the steering input portion includes a steering input member that is rotated by the steering column joint connected to the steering wheel through the steering column;
wherein the steering input member is a long shaft with teeth on the outside;
wherein the decelerator includes:
a ring gear that is engaged with the steering input member of the steering input portion and rotated by the steering wheel rotated by the driver;
planetary gears that rotate in engagement with an inside of the ring gear;
a sun gear that reciprocates the rack bar while rotating in engagement with an outside of the planetary gears;
a carrier that is rotated by an AFS input member of the AFS input portion and has long rod-shaped planetary gear fixing shafts that protrude from a side of the carrier to fix the carrier to the planetary gears; and
wherein the sun gear and the carrier respectively have a ball nut that is fitted in the sun gear and the carrier and engaged with the rack bar.

18. The system as defined in claim 17, wherein the AFS input portion includes the motor that is controlled by the AFS ECU to normally/reversely rotate and an AFS input member that is connected to a motor shaft of the motor and has teeth on the outside to transmit the rotational force in rotation.

19. A gear box active front steering system, comprising:
a steering column that is connected to a steering column joint, the steering column joint being connected to a gear box and configured to transmit a steering force applied to a steering wheel by a driver to the gear box that reciprocates a rack bar connected with tie rods that are connected to wheels;
an AFS ECU that calculates motor control values using steering values and information of speed of a vehicle to obtain desired steering output on the basis of the speed, and corrects the desired steering output when the result from the operation of a motor is fed-back; and
an actuator assembly that has an AFS input portion, a steering input portion, and a decelerator, the AFS input portion protruding from a side of a housing that accommodates the rack bar and forms the entire outer shape of the gear box, and normally/reversely rotating while communicating with the AFS ECU, the steering input portion vertically protruding from the gear box and connected to the steering column joint that is connected to the steering column that receives the steering force from the steering wheel, and the decelerator being mounted in the housing to allow the rack bar to reciprocate with rotation and generating final steering output that changes the steering response from the steering wheel to the driver on the basis of the speed of the vehicle that is traveling by adding the steering input to the AFS input;
wherein the steering input portion includes a steering input member that is rotated by the steering column joint connected to the steering wheel through the steering column; and
wherein the decelerator includes:
a ring gear that is engaged with the steering input member of the steering input portion and rotated by the steering wheel rotated by the driver;
planetary gears that rotate in engagement with an inside of the ring gear;
a sun gear that reciprocates the rack bar while rotating in engagement with an outside of the planetary gears;

a carrier that is rotated by a AFS input member of the AFS input portion and has long rod-shaped planetary gear fixing shafts that protrude from a side of the carrier to fix the carrier to the planetary gears; and wherein the steering input member is a long shaft with teeth on the outside;

wherein a part of the decelerator where the AFS input portion is connected includes the sun gear in which a ball nut engaged with the rack bar is fitted and the ring gear of which the inside is engaged with the planetary gears that are engaged with an outside of the sun gear, and a part of the decelerator where the steering input portion is connected includes a gear assembly that is fixed to the planetary gears to receive the rotational force from the planetary gears.

20. The system as defined in claim 19, wherein the AFS input portion includes the motor that is controlled by the AFS ECU to normally/reversely rotate and an AFS input member that is connected to a motor shaft of the motor and has teeth on the outside to transmit the rotational force in rotation.

* * * * *